US012595623B2

(12) United States Patent (10) Patent No.: US 12,595,623 B2
Visscher et al. (45) Date of Patent: Apr. 7, 2026

(54) PRIMARY CARPET BACKING FOR LATEX FREE TUFTED CARPETS

(71) Applicant: FREUDENBERG PERFORMANCE MATERIALS B.V., Arnhem (NL)

(72) Inventors: Edze Jan Visscher, Utrecht (NL); Arnold Koetsier, Westervoort (NL); Leonie Stigter, Driebergen (NL)

(73) Assignee: FREUDENBERG PERFORMANCE MATERIALS B.V., Arnhem (NL)

( * ) Notice: Subject to any disclaimer, the term of this patent is extended or adjusted under 35 U.S.C. 154(b) by 61 days.

(21) Appl. No.: 15/525,873

(22) PCT Filed: Nov. 9, 2015

(86) PCT No.: PCT/EP2015/076046
§ 371 (c)(1),
(2) Date: May 10, 2017

(87) PCT Pub. No.: WO2016/075072
PCT Pub. Date: May 19, 2016

(65) Prior Publication Data
US 2017/0314191 A1 Nov. 2, 2017

(30) Foreign Application Priority Data
Nov. 11, 2014 (EP) ..................................... 14192608

(51) Int. Cl.
*D06N 7/00* (2006.01)
*B32B 5/02* (2006.01)

(52) U.S. Cl.
CPC ........... *D06N 7/0068* (2013.01); *B32B 5/022* (2013.01); *B32B 5/024* (2013.01); *B32B 2471/02* (2013.01)

(58) Field of Classification Search
CPC .... D05C 17/023; D05C 17/02; D05C 17/026; D06N 7/0065; D06N 7/0068; D06N 2201/0254; D06N 2201/0263; D06N 2201/02; B32B 5/022; B32B 5/26; B32B 5/265–271; B32B 2471/02
See application file for complete search history.

(56) References Cited

U.S. PATENT DOCUMENTS

| | | | | | | |
|---|---|---|---|---|---|---|
| 3,325,323 | A | * | 6/1967 | Forkner | ................... | D04H 1/54 |
| | | | | | | 112/410 |
| 3,605,666 | A | * | 9/1971 | Kimmel | ................. | D05C 17/02 |
| | | | | | | 112/410 |
| 4,053,668 | A | * | 10/1977 | Kimmel | ................. | D05C 17/02 |
| | | | | | | 112/410 |
| 4,123,577 | A | * | 10/1978 | Port | ....................... | D05C 15/00 |
| | | | | | | 428/95 |
| 4,140,071 | A | * | 2/1979 | Gee | ........................ | D05C 17/02 |
| | | | | | | 112/475.23 |
| 4,242,394 | A | * | 12/1980 | Leib | ...................... | D05C 17/02 |
| | | | | | | 428/95 |
| 4,258,094 | A | * | 3/1981 | Benedyk | ................... | D04H 1/54 |
| | | | | | | 156/148 |
| 4,439,476 | A | * | 3/1984 | Guild | ..................... | D04H 11/00 |
| | | | | | | 156/148 |
| 4,705,706 | A | * | 11/1987 | Avery | .................... | D05C 17/02 |
| | | | | | | 428/17 |
| 5,494,724 | A | * | 2/1996 | Lang | ........................ | B32B 5/06 |
| | | | | | | 428/95 |
| 5,532,035 | A | * | 7/1996 | Corbin | ..................... | D04H 1/48 |
| | | | | | | 428/95 |
| 5,536,551 | A | * | 7/1996 | Woosley | ................... | B32B 5/08 |
| | | | | | | 428/92 |
| 5,556,684 | A | * | 9/1996 | Forero | ...................... | B32B 5/02 |
| | | | | | | 428/95 |
| 5,604,009 | A | * | 2/1997 | Long | ........................ | B32B 5/26 |
| | | | | | | 428/95 |
| 5,630,896 | A | * | 5/1997 | Corbin | ..................... | D04H 1/48 |
| | | | | | | 156/148 |
| 5,654,067 | A | * | 8/1997 | Dinger | ................... | D03D 27/00 |
| | | | | | | 428/95 |
| 6,280,818 | B1 | * | 8/2001 | Smith | ...................... | B32B 5/26 |
| | | | | | | 428/95 |
| 6,740,385 | B2 | * | 5/2004 | Gardner | ................... | B32B 5/06 |
| | | | | | | 428/85 |
| 6,849,565 | B1 | * | 2/2005 | Gardner | .............. | D06N 7/0065 |
| | | | | | | 428/95 |
| 7,670,661 | B2 | * | 3/2010 | Stroppiana | ............. | E01C 13/08 |
| | | | | | | 428/95 |
| 9,644,314 | B2 | * | 5/2017 | Visscher | ................... | B32B 5/08 |
| 2002/0172795 | A1 | * | 11/2002 | Gardner | ................... | B32B 5/06 |
| | | | | | | 428/85 |

(Continued)

FOREIGN PATENT DOCUMENTS

| | | |
|---|---|---|
| EP | 0568916 A1 | 11/1993 |
| JP | 10025652 A * | 1/1998 |

(Continued)

OTHER PUBLICATIONS

English translation of JP 2007-239110A, Google Patents, 2007.*

(Continued)

*Primary Examiner* — Larissa Rowe Emrich
(74) *Attorney, Agent, or Firm* — Oliff PLC

(57) ABSTRACT

A primary carpet backing for latex free tufted carpets, including tufting yarns tufted into the backing, the yarns consisting essentially of a first thermoplastic polymer selected from a polyamide, a polyester or a polyolefin, the polymer having a first melting temperature, and wherein the back stitches of the tufting yarns have been at least partially melted for achieving tuft bind in the latex free tufted carpet after the melted back stitches have been cooled to room temperature, the primary carpet backing including at least a first layer of fibers, wherein the backing consists for at least 30 wt. % of one or more lower melting polymers of the same polymer family as the first polymer included in the tufting yarns and wherein each of the lower melting polymers has a melting temperature which is equal to or less than the first melting temperature.

14 Claims, No Drawings

(56)  References Cited

U.S. PATENT DOCUMENTS

| | | | | |
|---|---|---|---|---|
| 2003/0175474 A1* | 9/2003 | Higgins | D06N 7/0084 | 428/95 |
| 2004/0197522 A1* | 10/2004 | Reisdorf | B29C 43/24 | 428/95 |
| 2004/0253410 A1* | 12/2004 | Higgins | B32B 5/26 | 428/96 |
| 2005/0142325 A1* | 6/2005 | Veurink | B60N 3/048 | 428/95 |
| 2005/0147787 A1* | 7/2005 | Bailey | D03D 27/00 | 428/95 |
| 2005/0260380 A1* | 11/2005 | Moon | D03D 1/00 | 428/95 |
| 2005/0284558 A1* | 12/2005 | Boerrigter | D06N 7/0065 | 156/72 |
| 2007/0172630 A1* | 7/2007 | Jones | B32B 5/022 | 442/364 |
| 2007/0270064 A1* | 11/2007 | Aseere | D05C 17/023 | 442/150 |
| 2008/0017294 A1* | 1/2008 | Bailey | B32B 5/26 | 156/72 |
| 2008/0044599 A1* | 2/2008 | Stroppiana | E01C 13/08 | 428/17 |
| 2008/0116129 A1* | 5/2008 | Oosterbroek | D04H 1/60 | 210/500.1 |
| 2008/0131649 A1* | 6/2008 | Jones | B32B 37/04 | 428/95 |
| 2008/0241459 A1* | 10/2008 | Higgins | B32B 5/06 | 428/95 |
| 2009/0011152 A1* | 1/2009 | Stroppiana | B32B 5/02 | 428/17 |
| 2009/0081406 A1* | 3/2009 | Higgins | B32B 5/06 | 428/95 |
| 2009/0152191 A1* | 6/2009 | Dijkema | B01D 39/1615 | 210/505 |
| 2012/0219751 A1* | 8/2012 | Nishida | D04B 1/025 | 428/91 |
| 2012/0244310 A1* | 9/2012 | Visscher | B32B 5/08 | 428/95 |
| 2013/0240117 A1* | 9/2013 | Reutelingsperger | D04H 11/00 | 156/72 |
| 2015/0176164 A1* | 6/2015 | Lucas | B32B 5/06 | 428/95 |
| 2017/0100914 A1* | 4/2017 | Visscher | B32B 5/08 | |
| 2017/0314191 A1* | 11/2017 | Visscher | B32B 5/024 | |
| 2020/0299876 A1* | 9/2020 | Jung | D05C 17/023 | |

FOREIGN PATENT DOCUMENTS

| | | | |
|---|---|---|---|
| JP | 11301330 A | * | 11/1999 |
| JP | 2007239110 A | * | 9/2007 |
| JP | 2008169517 A | * | 7/2008 |
| WO | 2014/016172 A1 | | 1/2014 |

OTHER PUBLICATIONS

English translation of JP 10-025652A, Japan Platform for Patent Information, 1998.*

Wikipedia entry for Polyethylene Terephthalate, https://en.wikipedia.org/wiki/Polyethylene_terephthalate, 2020.*

Feb. 9, 2016 International Search Report issued in International Patent Application No. PCT/EP2015/076046.

* cited by examiner

PRIMARY CARPET BACKING FOR LATEX FREE TUFTED CARPETS

The invention pertains to primary carpet backings and greige carpets for latex free tufted carpets, in particular to primary carpet backings comprising a layer of fibers and to greige carpets comprising such primary carpet backings.

The process of manufacturing a tufted carpet comprises the steps of providing a primary carpet backing into a tufting machine, tufting the primary carpet backing with tufting yarns, which generally are multifilament yarns, to obtain a greige carpet having a face side showing tufts and a back side where backstitches are formed. A tuft is the visible part of the tufting yarn on the face side of a greige or tufted carpet. A backstitch is the visible part of the tufting yarn on the backside of a greige carpet.

The primary carpet backing should exhibit good tuft holding characteristics. The primary carpet backing should have a high stitch holding capacity (SHC) to hold the tufts in place during the dynamic process of tufting to obtain tufts of essentially the same height for an even carpet surface in the greige carpet. The stitch holding capacity of a primary carpet backing is the ability to put the tufts in place during the tufting process where the tufts are formed and to hold the tufts in place, directly after being formed, during the formation of the following tufts. It determines the appearance of the face of the greige carpet and the formation of backtags in the greige carpet during the tufting process. A backtag is a loose or uneven backstitch in a greige carpet, in essence a tuft which was formerly on the face of the greige carpet that is now (partially) on the back side of the greige carpet. During subsequent processing steps, such as for example dyeing, the stitch holding capacity of the primary carpet backing should be high enough to retain the surface of the greige carpet as produced during tufting.

The newly formed tufts in the greige carpet are held into place by the stitch holding capacity (SHC) of the primary carpet backing. Stitch holding (SH) is the force required to remove a (loop of the) tufting yarn from a greige carpet from the back side. It determines how strong the interaction is, between the primary carpet backing and the tufting yarn in the greige carpet. The stitch holding determines the chance on failures in the subsequent processing steps after tufting, such as for example tentering and/or transport of rolls of greige carpet, until the tufting yarns have been locked in place. Each of these processing steps may be executed under severe conditions, for example regarding temperature and/or applied tensions, which pose high demands to the tuft holding characteristics of the primary carpet backing.

To lock the tufts in the greige carpet into place a pre-coat is generally applied to the back side of the greige carpet, generally either as a latex solution or as a foamed latex, and subsequently the pre-coat is dried, and optionally cured, to form bonds between the base of the tufts, i.e. the part of the tufting yarn which is in contact with the primary carpet backing, and the primary carpet backing.

After locking the tufts in place, a heavy layer can be applied onto the back side of the tufted carpet and/or a secondary carpet backing can be applied to obtain a tufted carpet, for example in the form of broadloom carpet, carpet tiles or mats.

The tuft bind, according to ISO 4919, is the maximum force required to remove one tuft completely out of the (finished) tufted carpet from the face side after locking the tufting yarns into place. The tuft bind is measured by gripping one end of a tuft, for cut pile e.g. with surgical forceps, or hooking a loop and recording the maximum force registered during the removal process. These tuft grips are attached to the upper jaw of a tensile testing apparatus. This apparatus has a means of clamping a specimen of the carpet to a base plate so that it is flat in a plane perpendicular to the direction of pull upon the tuft or loop.

At the end of the life cycle of the tufted carpet, a major amount of the tufted carpets are disposed of in landfills. Recycling of tufted carpets is desired, but a problem of pre-coated tufted carpets is that the carpet can not easily be recycled, one reason being the presence of a pre-coat. For example, polyamide-6 (also known as nylon-6 or PA6) based products can in principal be chemically recycled by depolymerizing the polyamide-6 products into monomers, purifying the depolymerized product stream, followed by repolymerization of the purified depolymerized product stream into regenerated nylon-6. For both technical and economical reasons the polyamide-6 content of the material to be recycled should be as high as possible.

Carpet manufacturers and equipment manufacturers therefore are considering alternatives for application of a pre-coat to lock the tufting yarns in the greige carpet in place.

For example, EP 1598476 A1 discloses a method for manufacturing latex-free tufted carpets wherein the backside of a greige carpet is brought in contact with the surface of a heated roller causing the backstitches of the thermoplastic tufting yarns to melt, whereby the individual fibers of tufting yarn will adhere to each other and to the primary carpet backing upon cooling to room temperature in order to anchor the tufting yarns to the primary carpet backing. A thermoplastic adhesive may additionally be applied to the backside of the greige carpet to further improve anchoring of the tufting yarns to the primary carpet backing.

WO 2012/076348 A2 discloses a process for producing tufted carpets without need of a pre-coat, wherein a greige carpet is fed at a relative speed along a body having a heated surface, the back side of the greige carpet being pressed against the heated surface to at least partially melt the tufting yarns and to spread the molten material of the tufting yarns such that the individual fibers of tufting yarn will adhere to each other and to the primary carpet backing.

EP 0568916 A1 discloses a recyclable tufted fabric made of only one type of thermoplastic material.

Although known primary carpet backings may be used in the above mentioned processes for manufacturing latex-free tufted carpets, it has been observed that the tuft bind in the tufted primary carpet backings treated by above mentioned processes may still be insufficient in some cases, especially for tufted carpets subjected to severe traffic. Therefore, in the method of EP 1598476 A1, a thermoplastic adhesive may additionally be applied to the backside of the greige carpet before the greige carpet is brought in contact with the surface of the heated roller to further improve anchoring of the tufting yarns to the primary carpet backing.

It is an object of the invention to provide an improved primary carpet backing in a greige carpet to provide improved latex free tufted carpets.

The object of the invention can be achieved with a greige carpet for latex free tufted carpets comprising a primary carpet backing and tufting yarns tufted into the primary carpet backing, the tufting yarns consisting essentially of a first thermoplastic polymer, in particular selected from a polyamide, a polyester or a polyolefin, the first polymer having a first melting temperature, the primary carpet backing comprising at least a first layer of fibers, wherein the primary carpet backing consists for at least 30 wt. % of one or more lower melting polymers of the same polymer family as the first polymer comprised in the tufting yarns, wherein each of the one or more lower melting polymers of the same polymer family comprised in the primary carpet backing has a melting temperature which is equal to or less than the first melting temperature, wherein the primary carpet backing comprises one or more higher melting polymers, wherein each of the one or more higher melting polymers comprised in the primary carpet backing has a melting temperature which is higher than the first melting temperature, and wherein at least one of the one or more higher melting polymers comprised in the primary carpet backing is of a different polymer family as the first polymer comprised in the tufting yarns.

The melting temperature of a polymer is determined by Differential Scanning Calorimetry (DSC) according to ISO 11357-3.

The one or more lower melting polymers comprised in the primary carpet backing, of the same polymer family as the first polymer comprised in the tufting yarns, provides adhesion to the first polymer for increasing the tuft bind of the tufting yarns in the latex free tufted carpet.

The tufting yarns in the latex free tufted carpet essentially consist of the first thermoplastic polymer, but may comprise up to 25 wt. %, preferably up to 20 wt. %, more preferably up to 15 wt. %, even more preferably up to 10 wt. %, most preferably up to 5 wt. % based on the total weight of the tufting yarns, of commonly used additives, such as for example spinning auxiliaries, fillers, flame retardant materials, UV inhibitors, crystallization retarders/accelerators, plasticizers, heat stabilizers, antimicrobial additives, anti-static agents, colouring agents or any combination thereof. The tufting yarns in the latex free tufted carpet may also comprise a first type of fibers essentially consisting of the first thermoplastic polymer and a second type of fibers, in particular consisting of a second thermoplastic polymer, provided that the tufting yarns are comprised for at least 75 wt. %, preferably at least 85 wt. %, more preferably at least 90 wt. %, of the first thermoplastic polymer based on the total weight of the tufting yarns, so that the tufting yarns essentially consist of the first thermoplastic polymer.

The term polymer as used herein, generally includes but is not limited to, homopolymers, co-polymers, such as for example, block, graft, random and alternating co-polymers, terpolymers, etc., and blends and/or modifications thereof.

The term polyolefin as used herein, is intended to mean any of a series of largely saturated open chain polymeric hydrocarbons composed only of carbon and hydrogen. Typical polyolefins include, but are not limited to, polyethylene, such as for example low density polyethylene, high density polyethylene or linear low density polyethylene, polypropylene, polybutylene, polymethylpentene and various combinations of ethylene, propylene, butylene, pentene and/or methylpentene monomers.

The term polyethylene as used herein is intended to encompass not only homopolymers of ethylene, but also co-polymers wherein at least 85% of the recurring units are ethylene units.

Preferably, the polyethylene comprised as the first polymer in the tufting yarn of the latex free tufted carpet and/or comprised as lower melting polymer in the primary carpet backing is a polyethylene homopolymer.

The term polypropylene as used herein is intended to embrace not only homopolymers of propylene but also co-polymers where at least 85% of the recurring units are propylene units.

Preferably, the polypropylene comprised as the first polymer in the tufting yarn of the latex free tufted carpet and/or comprised as lower melting polymer in the primary carpet backing is a polypropylene homopolymer.

The term polyester as used herein is intended to embrace polymers wherein at least 85% of the recurring units are condensation products of carboxylic acids and dihydroxy alcohols with polymer linkages created by formation of an ester unit. This includes, but is not limited to, aromatic, aliphatic, saturated, and unsaturated acids and di-alcohols. The term polyester as used herein also includes co-polymers, such as block, graft, random and alternating co-polymers, blends, and modifications thereof. Preferred polyesters are polyethylene terephthalate (PET), which is a condensation product of ethylene glycol and terephthalic acid, polybutylene terephthalate (PBT), polytrimethylene terephthalate (PTT), polyethylene naphthalate (PEN) and polylactic acid (PLA).

Preferably, the polyester comprised as the first polymer in the tufting yarn of the latex free tufted carpet and/or comprised as lower melting polymer in the primary carpet backing is a polyester homopolymer.

The term polyamide as used herein is intended to embrace polymers wherein at least 85% of the recurring units are condensation products of an amino group and a carboxylic acid or acid chloride group with polymer linkages created by formation of an amide unit. The term polyamide as used herein also includes co-polymers, such as block, graft, random and alternating co-polymers, blends, and modifications thereof. Preferred polyamides are polyamide-6 (PA6), polyamide-6,6 (PA6,6), polyamide-6,10 (PA6,10), polyamide-6,12 (PA6,12), polyamide-6,T (PA6,T) and copolymers of polyamide-6 and polyamide-6,6.

Preferably, the polyamide comprised as the first polymer in the tufting yarn of the latex free tufted carpet and/or comprised as lower melting polymer in the primary carpet backing is a polyamide homopolymer.

The term members of the same polymer family is understood to mean that monomers comprised in the first polymer and monomers comprised in the second polymer are connected by the same type of chemical bond, as is well known to the person skilled in the art. For example, when in the first polymer two monomers are connected by an ester unit, i.e. an ester-bond, and in the second polymer two monomers are connected by an ester-bond, the first polymer and the second polymer are members of the polyester polymer family. When, for example, in the first polymer two monomers are connected by an amide unit, i.e. an amide-bond, and in the second polymer two monomers are connected by an amide-bond, the first polymer and the second polymer are members of the polyamide polymer family.

Preferably, at least 50% of the chemical bonds between monomers in the first polymer and at least 50% of the chemical bonds between monomers in the second polymer are the same chemical bonds. More preferably, at least 75% of the chemical bonds between monomers in the first polymer and at least 75% of the chemical bonds between monomers in the second polymer are the same chemical bonds. More preferably, at least 90% of the chemical bonds between monomers in the first polymer and at least 90% of the chemical bonds between monomers in the second polymer are the same chemical bonds. Even more preferably, at least 95% of the chemical bonds between monomers in the first polymer and at least 95% of the chemical bonds between monomers in the second polymer are the same chemical bonds. Most preferably, at least 98% of the chemical bonds between monomers in the first polymer and at least 98% of the chemical bonds between monomers in the second polymer are the same chemical bonds to obtain a higher tuft bind in the latex free tufted carpet.

Preferably, the number of carbon atoms in the different monomers constituting a lower melting polymer, in particular a polyamide polymer, comprised in the primary carpet backing differ by at most 5, preferably by at most 3, more preferably by at most 2.

In a preferred embodiment, the one or more lower melting polymers comprised in the primary carpet backing are comprised in the form of fibers. The term fibers is understood to refer to both staple fibers and filaments. Staple fibers are fibers which have a specified, relatively short length, generally in the range of 2 to 200 mm. Filaments are fibers having a length of more than 200 mm, preferably more than 500 mm, more preferably more than 1000 mm. Filaments may preferably be virtually endless, for example when formed by continuous extrusion and drawing of a filament through a spinning hole in a spinneret. The term fibers is understood to encompass fibers having any cross sectional shape, including round, trilobal, multilobal or rectangular, the latter exhibiting a width and a height wherein the width may be considerably larger than the height, so that the fiber is a tape. Preferably, the width of the tapes is at least one order of magnitude higher, more preferably at least two orders of magnitude higher, than the height of the tapes.

Preferably, the fibers comprising the one or more lower melting polymers are comprised at least in the first layer of fibers.

Preferably, the primary carpet backing is supplied into the tufting machine with the first layer of fibers comprised in the primary carpet backing facing the tufting needles such that the backstitches in the greige carpet will be in contact with the first layer of fibers.

In an embodiment, the fibers comprising the one or more lower melting polymers are comprised at least in the first layer of fibers, the first layer of fibers being a nonwoven layer of fibers. The first nonwoven layer of fibers comprised in the primary carpet backing may in principle be any type of nonwoven, such as for example staple fiber nonwovens produced by well-known processes, such as carding processes, wet-laid processes or air-laid processes, or any combination thereof. The first nonwoven layer of fibers may also be a nonwoven composed of filaments produced by well-known spunbonding processes wherein filaments are extruded from a spinneret and subsequently laid down on a conveyor belt as a web of filaments and subsequently consolidated, also known as bonding, the web to form a nonwoven layer of fibers, or by a two-step process wherein filaments are spun and wound on bobbins, preferably in the form of multifilament yarns, followed by the step of unwinding the filaments or multifilament yarns and laying the filaments down on a conveyor belt as a web of filaments and consolidating the web to form a nonwoven layer of fibers.

The first nonwoven layer of fibers may have been consolidated by any suitable known consolidation technology, including mechanical consolidation, for example by stitching, mechanical needling and/or hydrodynamic consolidation by fluid jets, in particular by hydroentanglement, by chemical consolidation, for example by applying a binder dispersion or a binder solution to the nonwoven layer of fibers, which is generally dried and optionally cured, and/or by thermal consolidation, for example by calandering, ultrasonic bonding and/or hot air bonding.

Each of the one or more lower melting polymers comprised in the first nonwoven layer of fibers of the primary carpet backing may be comprised in one or more types of monocomponent fibers. Each of the one or more types of monocomponent fibers essentially consist of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the monocomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring agents or any combination thereof.

The monocomponent fibers comprised in the first nonwoven layer of fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Each of the one or more lower melting polymers comprised in the first nonwoven layer of fibers of the primary carpet backing may be comprised in one or more types of multicomponent fibers, preferably in bicomponent fibers. A basic distinction is being drawn between three types of bicomponent fibers: side-by-side types, core-sheath types and islands-in-the-sea types bicomponent fibers.

In an embodiment the melting points of the two polymers building the bicomponent fibers differ by at least 10° C., preferably at least 20° C. In another embodiment the melting points differ by at least 50° C. The first nonwoven layer of fibers comprising such bicomponent fibers could be thermally bonded by subjecting the web of fibers to a temperature in the range of the melting point of the polymer with the lower melting point. In a preferred embodiment the first nonwoven layer of fibers is predominantly made from core-sheath type bicomponent fibers, preferably filaments. Predominantly is understood to mean that at least 50% of the fibers comprised in the nonwoven layer of fibers are core-sheath type bicomponent fibers, preferably at least 75%, more preferably at least 90%, even more preferably at least 95%, most preferably 100%.

Preferably the core/sheath ratio in the core/sheath bicomponent fibers lies between 95/5 Vol. % and 5/95 Vol. %. More preferably the core/sheath ratio lies between 50/50 Vol. % and 95/5 Vol. %.

Preferably, at least one of the components of the multicomponent fibers comprised in the first nonwoven layer of fibers of the primary carpet backing essentially consists of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the multicomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring or any combination thereof. When the multicomponent fibers comprised in the primary carpet backing are bicomponent core-sheath fibers, preferably the sheath of the bicomponent core-sheath fibers consists of one of the lower melting polymers. When the multicomponent fibers comprised in the first nonwoven layer of fibers of the primary carpet backing are bicomponent islands-in-the-sea fibers, preferably the sea of the bicomponent islands-in-the-sea fibers consists of one of the lower melting polymers.

The multicomponent fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Preferably, the fibers in the first nonwoven layer of fibers are filaments in order to provide higher tensile strength and/or higher tear strength to the primary carpet backing, to the greige carpet and/or to the latex free tufted carpet.

The linear density of the fibers comprised in the first nonwoven layer fibers may vary, but preferably the linear density of the fibers is at least 1 dtex, more preferably at least 2 dtex, more preferably at least 5 dtex to provide adequate mechanical properties to the primary carpet backing. The unit dtex is defined as the weight of the fiber in grams per 10000 m length. The linear density of the fibers comprised in the first nonwoven layer fibers preferably is at most 30 dtex, more preferably at most 25 dtex, more preferably at most 20 dtex, most preferably at most 15 dtex to provide sufficient surface coverage in the first nonwoven layer of fibers for sufficient stitch holding capacity in the primary carpet backing.

In an embodiment, the fibers comprising the one or more lower melting polymers are comprised at least in the first layer of fibers, the first layer of fibers being a woven layer of fibers. The first layer of fibers being a woven layer of fibers is advantageous to further increase the tuft bind in the latex free tufted carpet.

The first woven layer of fibers comprises warp threads extending in machine direction and weft threads extending in cross machine direction woven into a woven layer of fibers by weaving processes well known to the person skilled in the art.

The weave construction of the first woven layer of fibers may vary, but preferably the weft threads of the first woven layer are essentially arranged in direct contact with their neighbouring weft threads to increase the stitch holding capacity of the greige carpet. The term essentially arranged in direct contact with their neighbouring weft threads is defined that the sum of the width of all the weft threads being woven into a woven layer of fibers of a selected length, e.g. a selected length of 1 meter of the woven layer of fibers, is approximately equal to the selected length of the woven layer of fibers. Preferably, the sum of the width of all the weft threads is at least 90% of the selected length of the woven layer of fibers, preferably at least 95%, more preferably at least 98%, preferably at least 99% of the selected length of the woven layer of fibers.

The fibers forming the weft threads of the first woven layer of fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Preferably, at least 50% of the weft threads of the first woven layer of fibers are tapes, more preferably at least 75%, more preferably at least 90%, even more preferably at least 95%, to further increase the stitch holding capacity in the greige carpet and/or the tuft bind in the latex free tufted carpet. In an embodiment 100% of the weft threads of the first woven layer of fibers are tapes.

The amount of warp threads in the first woven layer of fibers per meter width of primary carpet backing may vary widely. The amount of warp threads may be selected such that the weft threads are sufficiently locked into a coherent first woven layer of fibers and/or that the tensions applied in the tufting process and/or in subsequent processing steps, such as for example the step of melting of the back stitches, do not result in excessive elongation of the primary carpet backing, the greige carpet and/or the latex free tufted carpet.

The warp threads may comprise fibers, which may have any cross sectional shape, including round, trilobal, multi-lobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

The tapes comprised as warp and/or weft threads in the first woven layer of fibers may be monocomponent tapes. The monocomponent tapes may essentially consist of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the monocomponent tapes, of another polymer and/or of commonly used additives, such as for example spinning auxiliaries, fillers, flame retardant materials, UV inhibitors, crystallization retarders/accelerators, plasticizers, heat stabilizers, antimicrobial additives, antistatic agents, colouring agents or any combination thereof. The monocomponent tapes may essentially consist of polypropylene or of polyester, in particular polyethylene terephthalate.

In an embodiment, the tapes comprised as warp and/or weft threads in the first woven layer of fibers may be multicomponent tapes, in particular multi-layered tapes. The tapes may be two-layered tapes or three-layered tapes, wherein both outer layers preferably consist of the same polymer. Such multilayer tapes may be prepared by well-known processes, including co-extrusion processes or by lamination processes.

In an embodiment the melting points of the two polymers building the layered tapes differ by at least 10° C., preferably at least 20° C. In another embodiment the melting points differ by at least 50° C. The first woven layer of fibers comprising such layered tapes could be thermally bonded by subjecting the woven layer of fibers to a temperature in the range of the melting point of the polymer with the lower melting point. In a preferred embodiment the first woven layer of fibers is predominantly made from layered tapes, preferably comprising two or three layers. Predominantly is understood to mean that at least 50%, preferably at least 75%, more preferably at least 90%, even more preferably at least 95%, most preferably 100%, of the tapes comprised in the woven layer of fibers are layered tapes, preferably comprising two or three layers.

Preferably, at least one of the components of the layered tapes comprised in the primary carpet backing essentially consists of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the multicomponent fibers, of another polymer and/or of commonly used additives, such as for example spinning auxiliaries, fillers, flame retardant materials, UV inhibitors, crystallization retarders/accelerators, plasticizers, heat stabilizers, antimicrobial additives, antistatic agents, colouring or any combination thereof. When the tapes comprised in the primary carpet backing are layered tapes, preferably the at least one, or both outer layers of the layered tapes consists of one of the lower melting polymers.

The primary carpet backing may comprise a second layer of fibers, oriented plane parallel and preferably directly adjacent to the first layer of fibers.

The first layer of fibers and the second layer of fibers comprised in the primary carpet backing may be connected to each other by any suitable technology to form an integrated primary carpet backing to facilitate handling of the primary carpet backing, for example to facilitate guiding of the primary carpet backing into the tufting machine. The first layer of fibers and the second layer of fibers comprised in the primary carpet backing may be connected by any suitable known technology, including mechanical connection technology, for example by stitching, mechanical needling and/or hydrodynamic action by fluid jets, in particular by hydroentanglement, by chemical connection technology, for example by applying an adhesive or a binder dispersion or a binder solution between the first layer of fibers and the second layer of fibers, and/or by thermal treatment, for example by calandering, ultrasonic bonding and/or hot air bonding.

Alternatively, the first layer of fibers and the second layer of fibers comprised in the primary carpet backing may be supplied into the tufting process as two separate layers, oriented plane parallel, and preferably the second layer of fibers is arranged directly adjacent to the first layer of fibers. Preferably, the tensions in the tufting process are applied to the first layer of fibers and the second layer of fibers comprised in the primary carpet backing simultaneously. Although it is more difficult to keep two separate layers of fibers aligned to each other, it has been observed that a primary carpet backing wherein the first layer of fibers and the second layer of fibers are supplied as two separate layers is easier to tuft as compared to an integrated primary carpet backing wherein the first layer of fibers and the second layer fibers are connected to each other, in particular when the total weight of the primary carpet backing is at least 140 $g/m^2$, or at least 160 $g/m^2$, or at least 200 $g/m^2$. For example, the penetration of the tufting needles into the primary carpet backing requires less force for a primary carpet backing comprising the first layer of fibers and the second layer of fibers as two separate layers of fibers as compared to an integrated primary carpet backing comprising the first layer of fibers and the second layer of fibers connected to each other.

Preferably, the primary carpet backing is supplied into the tufting machine with the first layer of fibers comprised in the primary carpet backing facing the tufting needles such that the backstitches in the greige carpet will be in contact with the first layer of fibers.

In an embodiment, one or more of the lower melting polymers comprised in the primary carpet backing is/are comprised in the second layer of fibers, preferably in fibers comprised in the second layer of fibers.

The second layer of fibers comprised in the primary carpet backing may be a nonwoven layer of fibers. The second nonwoven layer of fibers comprised in the primary carpet backing may be any type of nonwoven, such as for example staple fiber nonwovens produced by well-known processes, such as carding processes, wet-laid processes or air-laid processes, or any combination thereof. The second nonwoven layer of fibers may also be a nonwoven composed of filaments produced by well-known spunbonding processes wherein filaments are extruded from a spinneret and subsequently laid down on a conveyor belt as a web of filaments and subsequently consolidating, also known as bonding, the web to form a nonwoven layer of fibers, or by a two-step process wherein filaments are spun and wound on bobbins, preferably in the form of multifilament yarns, followed by the step of unwinding the filaments or multifilament yarns and laying the filaments down on a conveyor belt as a web of filaments and consolidating the web to form a nonwoven layer of fibers.

The second nonwoven layer of fibers may have been consolidated by any suitable known consolidation technology, including mechanical consolidation, for example by stitching, mechanical needling and/or hydrodynamic consolidation by fluid jets, in particular by hydroentanglement, by chemical consolidation, for example by applying a binder dispersion or a binder solution to the nonwoven layer of fibers, which is generally dried and optionally cured, and/or by thermal consolidation, for example by calandering, ultrasonic bonding and/or hot air bonding.

Each of the one or more lower melting polymers comprised in the second nonwoven layer of fibers of the primary carpet backing may be comprised in one or more types of monocomponent fibers. Each of the one or more types of monocomponent fibers essentially consist of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the monocomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring agents or any combination thereof.

The monocomponent fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Each of the one or more lower melting polymers comprised in the second nonwoven layer of fibers of the primary carpet backing may be comprised in one or more types of multicomponent fibers, preferably in bicomponent fibers. A basic distinction is being drawn between three types of bicomponent fibers: side-by-side types, core-sheath types and islands-in-the-sea types bicomponent fibers.

In an embodiment the melting points of the two polymers building the bicomponent fibers differ by at least 10° C., preferably at least 20° C. In another embodiment the melting points differ by at least 50° C. The second nonwoven layer of fibers comprising such bicomponent fibers could be thermally bonded by subjecting the web of fibers to a temperature in the range of the melting point of the polymer with the lower melting point. In a preferred embodiment the second nonwoven layer of fibers is predominantly made from core-sheath type bicomponent fibers, preferably filaments. Predominantly is understood to mean that at least 50%, preferably at least 75%, more preferably at least 90%, even more preferably at least 95%, most preferably 100%, of the fibers comprised in the second nonwoven layer of fibers are core-sheath type bicomponent fibers.

Preferably the core/sheath ratio in the core/sheath bicomponent fibers lies between 95/5 Vol. % and 5/95 Vol. %. More preferably the core/sheath ratio lies between 50/50 Vol. % and 95/5 Vol. %.

Preferably, at least one of the components of the multi-component fibers comprised in the second nonwoven layer of fibers of the primary carpet backing essentially consists of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the multicomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring or any combination thereof. When the multicomponent fibers comprised in the second nonwoven layer of fibers of the primary carpet backing are bicomponent core-sheath fibers, preferably the sheath of the bicomponent core-sheath fibers consists of one of the lower melting polymers. When the multicomponent fibers comprised in the first nonwoven layer of fibers of the primary carpet backing are bicomponent islands-in-the-sea fibers, preferably the sea of the bicomponent islands-in-the-sea fibers consists of one of the lower melting polymers.

The multicomponent fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Preferably, the fibers in the second nonwoven layer of fibers are filaments in order to provide higher tensile strength and/or higher tear strength to the primary carpet backing, to the greige carpet and/or to the latex free tufted carpet.

The linear density of the fibers comprised in the second nonwoven layer fibers may vary, but preferably the linear density of the fibers is at least 1 dtex, more preferably at least 2 dtex, more preferably at least 5 dtex to provide adequate mechanical properties to the primary carpet backing. The unit dtex is defined as the weight of the fiber in grams per 10000 m length. The linear density of the fibers comprised in the second nonwoven layer fibers preferably is at most 30 dtex, more preferably at most 25 dtex, more preferably at most 20 dtex, most preferably at most 15 dtex to provide sufficient surface coverage in the second nonwoven layer of fibers for sufficient stitch holding capacity in the primary carpet backing.

The second layer of fibers comprised in the primary carpet backing may be a woven layer of fibers. The second layer of fibers being a woven layer of fibers is advantageous to further increase the stitch holding capacity in the primary carpet backing and/or the tuft bind in the latex free tufted carpet.

In an embodiment, the fibers comprising the one or more lower melting polymers are comprised at least in the second layer of fibers, the second layer of fibers being a woven layer of fibers.

The second woven layer of fibers comprises warp threads extending in machine direction and weft threads extending in cross machine direction woven into a woven layer of fibers by processes well known to the person skilled in the art.

The weave construction of the second woven layer of fibers may vary, but preferably the weft threads of the second woven layer of fibers are essentially arranged in direct contact with their neighbouring weft threads to increase the stitch holding capacity of the greige carpet. The term essentially arranged in direct contact with their neighbouring weft threads is defined that the sum of the width of all the weft threads being woven into a woven layer of fibers of a selected length, e.g. a selected length of 1 meter of the woven layer of fibers, is approximately equal to the selected length of the woven layer of fibers. Preferably, the sum of the width of all the weft threads is at least 90% of the selected length of the woven layer of fibers, preferably at least 95%, more preferably at least 98%, preferably at least 99% of the selected length of the woven layer of fibers.

The fibers forming the weft threads of the second woven layer of fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Preferably, at least 50% of the weft threads of the second woven layer of fibers are tapes, more preferably at least 75%, more preferably at least 90%, even more preferably at least 95%, to further increase the stitch holding capacity in the greige carpet and/or the tuft bind in the latex free tufted carpet. In an embodiment 100% of the weft threads of the second woven layer of fibers are tapes.

The amount of warp threads in the second woven layer of fibers per meter width of primary carpet backing may vary widely. The amount of warp threads may be selected such that the weft threads are sufficiently locked into a coherent second woven layer of fibers and/or that the tensions applied in the tufting process and/or in subsequent processing steps, such as for example the step of melting of the back stitches, do not result in excessive elongation of the primary carpet backing, the greige carpet and/or the latex free tufted carpet.

The warp threads may comprise fibers, which may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

The tapes comprised as warp and/or weft threads in the second woven layer of fibers may be monocomponent tapes. The monocomponent tapes may essentially consist of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the monocomponent tapes, of another polymer and/or of commonly used additives, such as for example spinning auxiliaries, fillers, flame retardant materials, UV inhibitors, crystallization retarders/accelerators, plasticizers, heat stabilizers, antimicrobial additives, antistatic agents, colouring agents or any combination thereof. The monocomponent tapes may essentially consist of polypropylene or of polyester, in particular polyethylene terephthalate.

In an embodiment, the tapes comprised as warp and/or weft threads in the second woven layer of fibers may be multicomponent tapes, in particular multi-layered tapes. The tapes may be two-layered tapes or three-layered tapes, wherein both outer layers preferably consist of the same polymer. Such multilayer tapes may be prepared by well-known processes, including co-extrusion processes or by lamination processes.

In an embodiment the melting points of the two polymers building the layered tapes differ by at least 10° C., preferably at least 20° C. In another embodiment the melting points differ by at least 50° C. The second woven layer of fibers comprising such layered tapes could be thermally bonded by subjecting the woven layer of fibers to a temperature in the range of the melting point of the polymer with the lower melting point. In a preferred embodiment the second woven layer of fibers is predominantly made from layered tapes, preferably comprising two or three layers. Predominantly is understood to mean that at least 50%, preferably at least 75%, more preferably at least 90%, even more preferably at least 95%, most preferably 100%, of the tapes comprised in the woven layer of fibers are layered tapes, preferably comprising two or three layers.

Preferably, at least one of the components of the layered tapes comprised in the second woven layer of fibers of the primary carpet backing essentially consists of one of the lower melting polymers, but may comprise up to 25 wt. %, preferably up to 20 wt. %, more preferably up to 15 wt. %, even more preferably up to 10 wt. %, most preferably up to 5 wt. % based on the total weight of the multicomponent fibers, of another polymer and/or of commonly used additives, such as for example spinning auxiliaries, fillers, flame retardant materials, UV inhibitors, crystallization retarders/accelerators, plasticizers, heat stabilizers, antimicrobial additives, antistatic agents, colouring or any combination thereof. When the tapes comprised in the primary carpet backing are layered tapes, preferably the at least one, or both outer layers of the layered tapes consists of one of the lower melting polymers.

In an embodiment, the first layer of fibers and the second layer of fibers comprised in the primary carpet backing have essentially equal weight, preferably in the range of 35 g/m² to 150 g/m², preferably in the range of 40 g/m² to 135 g/m², more preferably in the range of 50 g/m² to 125 g/m², more preferably in the range of 60 g/m² to 110 g/m². The term essentially equal weight is understood to mean that the weight of the first layer of fibers and the weight of the second layer of fibers differ by at most 20%, preferably at most 10%, more preferably at most 5%.

Preferably, the primary carpet backing consists for at least 40 wt. %, more preferably for at least 50 wt. %, most preferably for at least 60 wt. %, of one or more lower melting polymers of the same polymer family as the first polymer.

The total mass of the one or more lower melting polymers of the same polymer family as the first polymer comprised in the primary carpet backing may be at least 20 g/m², preferably at least 40 g/m², preferably at least 60 g/m², more preferably at least 80 g/m², even more preferably at least 100 g/m², most preferably at least 120 g/m² to further improve the tuft bind in the latex free tufted carpet.

The primary carpet backing may comprise one or more higher melting polymers, each of the one or more higher melting polymers comprised in the primary carpet backing having a melting temperature which is higher than the first melting temperature of the first polymer comprised in the tufting yarns. The higher melting polymers in the primary carpet backing provide improved tensile strength and/or dimensional stability to the latex free tufted carpet. Preferably, the primary carpet backing consists for at least 20 wt. %, more preferably for at least 25 wt. %, more preferably for at least 30 wt. %, of one or more higher melting polymers.

Each of the one or more higher melting polymers individually may be of the same polymer family as the first polymer comprised in the tufting yarn for improving the recycling-ability of the latex free tufted carpet or may be of a different polymer family as the first polymer comprised in the tufting yarn. However, each of the one or more higher melting polymers may be of a different polymer family as the first polymer comprised in the tufting yarn to optimize the properties of the primary carpet backing, the greige carpet and/or the latex free tufted carpet, for example regarding the dimensional stability of the primary carpet backing, the greige carpet and/or the latex free tufted carpet, the dyeability of the primary carpet backing, and/or the tuftability of the primary carpet backing, such as for example reduced needle penetration resistance of the primary carpet backing, and/or the mechanical properties, such as for example the strength at break and/or the elongation at break, of the greige carpet and/or the latex free tufted carpet.

At least one of the one or more higher melting polymers comprised in the primary carpet backing is of a different polymer family as the first polymer comprised in the tufting yarns. Preferably, each of the one or more higher melting polymers comprised in the primary carpet backing is of a different polymer family as the first polymer comprised in the tufting yarns.

Preferably, the primary carpet backing consists for at most 60 wt. %, more preferably for at most 50 wt. %, most preferably for at most 40 wt. %, of one or more higher melting polymers having a melting temperature which is higher than the first melting temperature of the first polymer comprised in the tufting yarns.

In an embodiment, the total mass of the one or more higher melting polymers comprised in the primary carpet backing is at least 20 g/m², preferably at least 40 g/m², preferably at least 60 g/m², more preferably at least 80 g/m², even more preferably at least 100 g/m², most preferably at least 120 g/m² to further improve the tensile strength and/or dimensional stability of the latex free tufted carpet.

In a preferred embodiment, the one or more higher melting polymers comprised in the primary carpet backing are comprised in the form of fibers, more preferably in the form of filaments to further improve the tensile strength and/or dimensional stability of the primary carpet backing, the greige carpet and/or the latex free tufted carpet. The fibers comprising the one or more higher melting polymers may be comprised in the first nonwoven layer of fibers, in the first woven layer of fibers, in the second nonwoven layer of fibers and/or in the second woven layer of fibers.

Each of the one or more higher melting polymers comprised in the primary carpet backing may be comprised in one or more types of monocomponent fibers. Each of the one or more types of monocomponent fibers essentially consist of one of the higher melting polymers, but may comprise up to 25 wt. %, preferably up to 20 wt. %, more preferably up to 15 wt. %, even more preferably up to 10 wt. %, most preferably up to 5 wt. % based on the total weight of the monocomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring agents or any combination thereof. The monocomponent fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

Each of the one or more higher melting polymers comprised in the primary carpet backing may be comprised in one or more types of multicomponent fibers, preferably in bicomponent fibers. A basic distinction is being drawn between three types of bicomponent fibers: side-by-side types, core-sheath types and islands-in-the-sea types bicomponent fibers.

In an embodiment the melting points of the two polymers building the bicomponent fibers differ by at least 10° C., preferably at least 20° C., wherein the melting temperature of at least one component is equal to or higher than the first melting temperature of the first polymer comprised in the tufting yarns. In an embodiment the melting points differ by at least 50° C. The first layer of fibers and/or the second layer of fibers comprising such bicomponent fibers could be thermally bonded by subjecting the layers of fibers to a temperature in the range of the melting point of the polymer with the lower melting point. In a preferred embodiment the first layer of fibers and/or the second layer is predominantly made from core-sheath type bicomponent fibers, preferably filaments. Predominantly is understood to mean that at least 50%, preferably at least 75%, more preferably at least 90%, even more preferably at least 95%, most preferably 100%, of the fibers comprised in the layer of fibers are core-sheath type bicomponent fibers.

Preferably the core/sheath ratio in the core/sheath bicomponent fibers lies between 95/5 Vol. % and 5/95 Vol. %. More preferably the core/sheath ratio lies between 50/50 Vol. % and 95/5 Vol. %.

Preferably, at least one of the components of the multicomponent fibers comprised in the primary carpet backing essentially consists of one of the higher melting polymers, but may comprise up to 25 wt. %, preferably up to 20 wt. %, more preferably up to 15 wt. %, even more preferably up to 10 wt. %, most preferably up to 5 wt. % based on the total weight of the multicomponent fibers, of commonly used additives, such as for example spinning auxiliaries, fillers, flame retardant materials, UV inhibitors, crystallization retarders/accelerators, plasticizers, heat stabilizers, antimicrobial additives, antistatic agents, colouring or any combination thereof. When the multicomponent fibers comprised in the primary carpet backing are bicomponent core-sheath fibers, preferably the core of the bicomponent core-sheath fibers consists of one of the higher melting polymers. When the multicomponent fibers comprised in the primary carpet backing are bicomponent islands-in-the-sea fibers, preferably the islands of the bicomponent islands-in-the-sea fibers consists of one of the higher melting polymers.

The multicomponent fibers may have any cross sectional shape, including round, trilobal, multilobal or rectangular, the latter exhibiting a width and a height wherein the width may be considerably larger than the height, so that the fiber in this embodiment is a tape. Preferably, the width of the tapes is at least one order of magnitude higher, more preferably at least two orders of magnitude higher, than the height of the tapes.

The fibers comprising the one or more higher melting polymers may be comprised in the first layer of fibers and/or in the second layer of fibers. Preferably, the fibers comprising the one or more higher melting polymers are comprised in the second layer of fibers such that the first layer of fibers comprised in the primary carpet backing is comprised only of one or more lower melting polymers of the same polymer family as the first polymer comprised in the tufting yarn.

The primary carpet backing may have a weight of at least 70 g/m², preferably at least 80 g/m², preferably at least 100 g/m², more preferably at least 120 g/m², even more preferably at least 150 g/m², most preferably at least 175 g/m² to further improve the stitch holding in the latex free tufted carpet. The primary carpet preferably has a weight of at most 300 g/m², preferably at most 270 g/m², more preferably at most 250 g/m², even preferably at most 220 g/m² such that the force for penetration of the tufting needles into the primary carpet backing (needle penetration resistance) does not lead to deflection of the tufting needle, leading to a misplacement of the tufting yarn in the greige carpet.

The thickness of the primary backing may vary, but is preferably at least 0.2 mm, preferably at least 0.3 mm, more preferably at least 0.5 mm, as determined according to DIN/ISO 9073-2 (October 1996), to further improve the tuft bind in the latex free tufted carpet. Preferably, the thickness of the primary backing is at most 3.0 mm, preferably at most 2.0 mm, more preferably at most 1.5 mm to facilitate tufting of the tufting yarns into the primary carpet backing.

The linear density of the fibers comprised in the first nonwoven layer of fibers and/or in the second nonwoven layer of fibers may vary, but preferably the linear density of the fibers is at least 1 dtex, more preferably at least 2 dtex, more preferably at least 5 dtex, more preferably at least 7 dtex. Preferably, the linear density of the fibers is at most 25 dtex, more preferably at most 20 dtex, more preferably at most 15 dtex.

The primary carpet backing may comprise one or more further material layers, each of the one or more further material layers preferably being selected from a nonwoven layer of fibers, a scrim, a grid or a film, for example to further improve the tensile strength and/or dimensional stability of the primary carpet backing, the greige carpet and/or the latex free tufted carpet.

In a specific embodiment, the first thermoplastic polymer in the tufting yarns of the latex free tufted carpet is a polyamide polymer, in particular polyamide-6 or polyamide-6,6, and the primary carpet backing consists for at least 30 wt. %, preferably at least 40 wt. %, more preferably at least 50 wt. %, most preferably at least 60 wt. %, of one or more lower melting polyamide polymers, in particular polyamide-6 and/or a copolyamide of polyamide-6 and polyamide-6,6. Preferably, the primary carpet backing consists for at most 70 wt. %, preferably at most 60 wt. %, more preferably at most 50 wt. %, most preferably at most 40 wt. %, of a higher melting polyester polymer, in particular polyethylene terephthalate.

In an embodiment, the primary carpet backing comprises a first nonwoven layer of fibers comprised for 40 wt. % to 80 wt. %, preferably 50 wt. % to 75 wt. %, more preferably 55 wt. % to 65 wt. %, of a polyester polymer, in particular of polyethylene terephthalate (PET), and for 20 wt. % to 60 wt. %, preferably 25 wt. % to 50 wt. %, more preferably 35 wt. % to 45 wt. %, of one or more polyamide polymers, in particular, and a second nonwoven layer of fibers comprised for 50 wt. % to 90 wt. %, preferably 60 wt. % to 85 wt. %, more preferably 70 wt. % to 80 wt. %, of a polyester polymer, in particular of polyethylene terephthalate (PET), and for 10 wt. % to 50 wt. %, preferably 15 wt. % to 40 wt. %, more preferably 20 wt. % to 30 wt. %, of one or more polyamide polymers, in particular polyamide-6 (PA6) and/or a copolyamide of polyamide-6 and polyamide-6,6.

In an embodiment, the primary carpet backing comprises a first nonwoven layer of fibers comprised for at least 50 wt. % preferably at least 75 wt. %, more preferably at least 85 wt. %, more preferably at least 95 wt. %, most preferably for 100 wt. % of one or more polyamide polymers, in particular polyamide-6 (PA6) and/or a copolyamide of polyamide-6 and polyamide-6,6, and a second nonwoven layer of fibers comprised for 50 wt. % to 90 wt. %, preferably 60 wt. % to 85 wt. %, more preferably 70 wt. % to 80 wt. %, of a polyester polymer, in particular of polyethylene terephthalate (PET), and for 10 wt. % to 50 wt. %, preferably 15 wt. % to 40 wt. %, more preferably 20 wt. % to 30 wt. %, of one or more polyamide polymers, in particular polyamide-6 (PA6) and/or a copolyamide of polyamide-6 and polyamide-6,6.

In a specific embodiment, the first thermoplastic polymer in the tufting yarns of the latex free tufted carpet is a polyester polymer, in particular polyethylene terephthalate, polybutylene terephthalate, polytrimethylene or polylactic acid, and the primary carpet backing consists for at least 30 wt. %, preferably at least 40 wt. %, more preferably at least 50 wt. %, most preferably at least 60 wt. %, of one or more lower melting polyester polymers, in particular polyethylene terephthalate, polybutylene terephthalate, polytrimethylene or polylactic acid and/or copolymers thereof.

In a specific embodiment, the first thermoplastic polymer in the tufting yarns of the latex free tufted carpet is a polyolefin polymer, in particular polyethylene or polypropylene, and the primary carpet backing consists for at least 30 wt. %, preferably at least 40 wt. %, more preferably at least 50 wt. %, most preferably at least 60 wt. %, of one or more lower melting polyolefin polymers, in particular polyethylene or polypropylene and/or copolymers thereof.

The primary carpet backing according to the invention enables that latex free tufted carpet can be manufactured exhibiting a tuft bind of higher than 25 N, preferably higher than 30 N.

The primary carpet backing according to the invention also enables the preparation of latex free tufted carpets having high content of polymers of the same polymer family, preferably of polyester polymers or of polyamide polymers, or even of a single type of polymer, in particular polyamide-6, to make recycling of the tufted carpet technically and economically feasible.

EXAMPLES

Example 1

A primary carpet backing was prepared consisting of a first nonwoven layer of fibers and a second nonwoven layer of fibers.

The first nonwoven layer of fibers as well as the second nonwoven layer of fibers was formed of bicomponent core-sheath filaments, which were spun and wound on bobbins in the form of multifilament yarns followed by the steps of unwinding the multifilament yarns and laying the filaments down on a conveyor belt as a web of filaments and thermally consolidating the web by through air bonding to form the first nonwoven layer of fibers or the second nonwoven layer of fibers.

The core component of the core-sheath filaments of the first nonwoven layer of fibers represented 76 wt. % of the core-sheath filaments and consisted of polyamide-6 (PA6) having a melting temperature of 220° C., and the sheath component represented 24 wt. % of the core-sheath filaments and consisted of a copolyamide of polyamide-6 and polyamide-6,6 having a melting temperature of 200° C.

The core component of the core-sheath filaments of the second nonwoven layer of fibers represented 76 wt. % of the core-sheath filaments and consisted of polyethylene terephthalate (PET) having a melting temperature of 250° C., and the sheath component represented 24 wt. % of the core-sheath filaments and consisted of polyamide-6 (PA6) having a melting temperature of 220° C.

The first nonwoven layer of fibers had a weight of 100 g/m² and the second nonwoven layer of fibers had a weight of 100 g/m².

The first nonwoven layer of fibers and the second nonwoven layer of fibers of the primary carpet backing were supplied into the tufting machine as two separate layers with the first nonwoven layer of fibers facing the tufting needles such that the backstitches in the greige carpet will be in contact with the first nonwoven layer of fibers. The tufting yarn consisted essentially of polyamide-6.

The high polyamide-6 content of the primary carpet backing improves the recycling-ability of the greige carpet and of latex free tufted carpets when prepared with the primary carpet backing in accordance with the processes in accordance with EP1598476 or WO2012/076348.

Following the teachings of EP1598476 and WO2012/076348 latex free carpets could be prepared exhibiting a tuft bind, according to ISO 4919, up to 40 N.

Example 2

A primary carpet backing was prepared consisting of a first nonwoven layer of fibers and a second nonwoven layer of fibers.

The first nonwoven layer of fibers as well as the second nonwoven layer of fibers was formed of bicomponent core-sheath filaments, which were spun and wound on bobbins in the form of multifilament yarns followed by the step of unwinding the multifilament yarns and laying the filaments down on a conveyor belt as a web of filaments and thermally consolidating the web by through air bonding to form the first nonwoven layer of fibers or the second nonwoven layer of fibers.

The core component of the core-sheath filaments of the first nonwoven layer of fibers represented 60 wt. % of the core-sheath filaments and consisted of polyethylene terephthalate (PET) having a melting temperature of 250° C., and the sheath component represented 40 wt. % of the core-sheath filaments and consisted of polyamide-6 (PA6) having a melting temperature of 220° C.

The core component of the core-sheath filaments of the second nonwoven layer of fibers represented 76 wt. % of the core-sheath filaments and consisted of polyethylene terephthalate (PET) having a melting temperature of 250° C., and the sheath component represented 24 wt. % of the core-sheath filaments and consisted of polyamide-6 (PA6) having a melting temperature of 220° C.

The first nonwoven layer of fibers had a weight of 100 g/m² and the second nonwoven layer of fibers had a weight of 100 g/m².

The first nonwoven layer of fibers and the second nonwoven layer of fibers of the primary carpet backing were supplied into the tufting machine as two separate layers with the first nonwoven layer of fibers facing the tufting needles such that the backstitches in the greige carpet will be in contact with the first nonwoven layer of fibers. The tufting yarn consisted essentially of polyamide-6.

The primary carpet backing improves the recycling-ability of the greige carpet and of latex free tufted carpets when prepared in accordance with the processes in accordance with EP1598476 or WO2012/076348.

Following the teachings of EP1598476 and WO2012/076348 latex free carpets could be prepared exhibiting a tuft bind, according to ISO 4919, up to 30 N.

Example 3

A primary carpet backing was prepared consisting of a first nonwoven layer of fibers, a second nonwoven layer of fibers, a third nonwoven layer of fibers and a fourth nonwoven layer of fibers. Each of the four nonwoven layer of fibers had a weight of 35 g/m².

The first nonwoven layer of fibers as well as the fourth nonwoven layer of fibers was formed of a mixture of a first and a second type of bicomponent core-sheath filaments in a 50/50 weight ratio, which were spun and wound on bobbins in the form of multifilament yarns followed by the step of unwinding the multifilament yarns and laying the filaments down on a conveyor belt as a web of filaments. The second nonwoven layer of fibers as well as the third nonwoven layer of fibers was formed completely of the first type bicomponent core-sheath filaments, which were spun and wound on bobbins in the form of multifilament yarns followed by the step of unwinding the multifilament yarns and laying the filaments down on a conveyor belt as a web of filaments. All four nonwoven layers of fibers were thermally consolidated into an integrated primary carpet backing by through air bonding.

The core component of the first type of core-sheath filaments of the first and fourth nonwoven layer of fibers represented 60 wt. % of the first type of core-sheath filaments and consisted of polyethylene terephthalate (PET) having a melting temperature of 250° C., and the sheath component represented 40 wt. % of the first type of core-sheath filaments and consisted of polyamide-6 (PA6) having a melting temperature of 220° C. The core component of the second type of core-sheath filaments of the first and fourth nonwoven layer of fibers represented 76 wt. % of the second type of core-sheath filaments and consisted of polyamide-6 (PA6) having a melting temperature of 220° C., and the sheath component represented 24 wt. % of the second type of core-sheath filaments and consisted of copolyamide of polyamide-6 and polyamide-6,6 having a melting temperature of 200° C.

The integrated primary carpet backing was supplied into the tufting machine. The tufting yarn consisted essentially of polyamide-6.

The primary carpet backing improves the recycling-ability of the greige carpet and of latex free tufted carpets prepared in accordance with the processes in accordance with EP1598476 or WO2012/076348.

Following the teachings of EP1598476 and WO2012/076348 latex free carpets could be prepared exhibiting a tuft bind, according to ISO 4919, up to 27 N.

Comparative Example

A primary carpet backing was prepared consisting of a first nonwoven layer of fibers.

The first nonwoven layer of fibers was formed of bicomponent core-sheath filaments, which were spun and wound on bobbins in the form of multifilament yarns followed by the step of unwinding the multifilament yarns and laying the filaments down on a conveyor belt as a web of filaments and thermally consolidating the web by through air bonding to form the first nonwoven layer of fibers.

The core component of the core-sheath filaments of the first nonwoven layer of fibers represented 76 wt. % of the core-sheath filaments and consisted of polyethylene terephthalate (PET) having a melting temperature of 250° C., and the sheath component represented 24 wt. % of the core-sheath filaments and consisted of polyamide-6 (PA6) having a melting temperature of 220° C. The first nonwoven layer of fibers had a weight of 100 g/m².

The primary carpet backing was supplied into the tufting machine. The tufting yarn consisted essentially of polyamide-6.

Following the teachings of EP1598476 and WO2012/076348 latex free carpets could be prepared exhibiting a tuft bind, according to ISO 4919, below 25 N.

What is claimed is:

1. A greige carpet for latex free tufted carpets, the greige carpet comprising:
   a primary carpet backing; and
   tufting yarns tufted into the primary carpet backing, the tufting yarns comprising at least 75 wt. % of a first thermoplastic polymer, based on a total weight of the tufting yarns, the first thermoplastic polymer having a first melting temperature,
   wherein:
   the primary carpet backing comprises at least 40 wt. % of one or more lower melting polymers of a same polymer family as the first thermoplastic polymer, based on a total weight of the primary carpet backing, each of the one or more lower melting polymers having a melting temperature which is equal to or less than the first melting temperature,
   the primary carpet backing comprises one or more higher melting polymers of a different polymer family as the first thermoplastic polymer, each of the one or more higher melting polymers having a melting temperature which is higher than the first melting temperature,
   the primary carpet backing is formed from at least a first nonwoven layer of fibers, the first nonwoven layer of fibers comprising a first surface and a second surface, and a second nonwoven layer of fibers, the second nonwoven layer of fibers disposed on the second surface of the first nonwoven layer of fibers and oriented plane parallel to the first nonwoven layer of fibers, the one or more lower melting polymers being included in at least the first nonwoven layer of fibers, and the one or more higher melting polymers being included in at least the second nonwoven layer of fibers,
   the tufting yarns
   (i) are in contact with the first nonwoven layer of fibers,
   (ii) are bonded to the first nonwoven layer of fibers by melting of backstitches of the tufting yarns in contact with the first nonwoven layer of fibers, and
   (iii) extend from the backstitches through the first nonwoven layer of fibers and the second nonwoven layer of fibers, and
   the second nonwoven layer of fibers is a topmost layer of the primary carpet backing that is a farthest layer from the backstitches.

2. The greige carpet according to claim 1, wherein the first nonwoven layer of fibers and the second nonwoven layer of fibers are connected to each other to form an integrated primary carpet backing.

3. The greige carpet according to claim 1, wherein the first thermoplastic polymer is a polyamide, and the primary carpet backing comprises at least 40 wt. % of one or more lower melting polyamide polymers, based on the total weight of the primary carpet backing.

4. The greige carpet according to claim 1, wherein the first thermoplastic polymer is a polyester, and the primary carpet backing contains at least 40 wt. % of one or more lower melting polyester polymers, based on the total weight of the primary carpet backing.

5. The greige carpet according to claim 1, wherein the first thermoplastic polymer is a polyolefin, and the primary carpet backing contains at least 40 wt. % of one or more lower melting polyolefin polymers, based on the total weight of the primary carpet backing.

6. The greige carpet according to claim 1, wherein no latex is used.

7. The greige carpet according to claim 2, wherein no latex is used.

8. The greige carpet according to claim 1, wherein the greige carpet for latex free tufted carpets is formed by a tufting process that includes supplying the first nonwoven layer and the second nonwoven layer into a tufting machine as two separate layers.

9. The greige carpet according to claim 1, wherein at least one of the first and the second nonwoven layer of fibers comprises bicomponent fibers.

10. The greige carpet according to claim 9, wherein the bicomponent fibers are core-sheath fibers.

11. The greige carpet according to claim 10, wherein the sheath of the core-sheath fibers includes a polymer having a lower melting point than a polymer of the core of the core-sheath fibers.

12. The greige carpet according to claim 9, wherein the first nonwoven layer comprises the bicomponent fibers.

13. The greige carpet according to claim 9, wherein the second nonwoven layer comprises the bicomponent fibers.

14. A greige carpet for latex free tufted carpets, the greige carpet comprising:

a primary carpet backing; and tufting yarns tufted into the primary carpet backing, the tufting yarns comprising at least 75 wt. % of a first thermoplastic polymer, based on a total weight of the tufting yarns, the first thermoplastic polymer having a first melting temperature, wherein:

the primary carpet backing comprises at least 40 wt. % of one or more lower melting polymers of a same polymer family as the first thermoplastic polymer, based on a total weight of the primary carpet backing, each of the one or more lower melting polymers having a melting temperature which is equal to or less than the first melting temperature, the primary carpet backing comprises one or more higher melting polymers of a different polymer family as the first thermoplastic polymer, each of the one or more higher melting polymers having a melting temperature which is higher than the first melting temperature, the primary carpet backing consists of one first nonwoven layer of fibers, the first nonwoven layer of fibers comprising a first surface and a second surface, and one second nonwoven layer of fibers, the second nonwoven layer of fibers disposed on the second surface of the first nonwoven layer of fibers and oriented plane parallel to the first nonwoven layer of fibers, the one or more lower melting polymers being included at least in the first nonwoven layer of fibers, and the one or more higher melting polymers being included at least in the second nonwoven layer of fibers, and the tufting yarns (i) are in contact with the first nonwoven layer of fibers, (ii) are bonded to the first nonwoven layer of fibers by melting of backstitches of the tufting yarns in contact with the first nonwoven layer of fibers, and (iii) extend from the backstitches through the first nonwoven layer of fibers and the second nonwoven layer of fibers.

* * * * *